US010740544B2

(12) United States Patent
Lynch et al.

(10) Patent No.: US 10,740,544 B2
(45) Date of Patent: Aug. 11, 2020

(54) ANNOTATION POLICIES FOR ANNOTATION CONSISTENCY

(71) Applicant: International Business Machines Corporation, Armonk, NY (US)

(72) Inventors: Sarah Lynch, Austin, TX (US); Kristi Farinelli, Philadelphia, PA (US); Rahul P. Akolkar, Austin, TX (US); Alexander Block, New York, NY (US); Joseph L. Sharpe, III, Waxhaw, NC (US); Stefan Van Der Stockt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 16/032,805

(22) Filed: Jul. 11, 2018

(65) Prior Publication Data
US 2020/0019599 A1    Jan. 16, 2020

(51) Int. Cl.
*G06F 40/247* (2020.01)
*G06F 40/169* (2020.01)
*G06F 16/11* (2019.01)

(52) U.S. Cl.
CPC .......... *G06F 40/169* (2020.01); *G06F 16/11* (2019.01); *G06F 40/247* (2020.01)

(58) Field of Classification Search
CPC .. G06F 17/241; G06F 17/274; G06F 17/2785; G06F 16/24573; G06K 9/00456
USPC .......................................................... 715/230
See application file for complete search history.

(56) References Cited

U.S. PATENT DOCUMENTS

| 7,392,466 | B2 | 6/2008 | Pan et al. |
| 7,689,578 | B2 | 3/2010 | Albornoz et al. |
| 8,331,739 | B1 | 12/2012 | Abdulkader et al. |
| 9,014,477 | B2 | 4/2015 | Abdulkader et al. |
| 2002/0129342 | A1 | 9/2002 | Kil et al. |
| 2008/0168080 | A1* | 7/2008 | Doganata ................ G06F 16/31 |
| 2010/0094854 | A1* | 4/2010 | Rouhani-Kalleh ........................ G06F 16/3325 707/706 |
| 2011/0106617 | A1* | 5/2011 | Cooper .................. G06Q 30/02 705/14.49 |
| 2011/0208758 | A1* | 8/2011 | Yehaskel ............ G06F 17/2795 707/752 |

(Continued)

FOREIGN PATENT DOCUMENTS

GB        2417109 A    2/2006

OTHER PUBLICATIONS

Sexton et al., "Designing a Semantic Ground Truth for Mathematical Formulas", 2008 (see p. 1). http://www.cs.bham.ac.uk/~aps/research/papers/pdf/SeSoSu10-DML10-DesigningASemanticGroundTruthForMathematicalFormulae.pdf.

*Primary Examiner* — Rinna Yi
(74) *Attorney, Agent, or Firm* — Pepper Hamilton LLP

(57) ABSTRACT

Embodiments provide a computer implemented method in a data processing system including a processor and memory storing instructions, which are executed by the processor to cause the processor to implement the method for providing an annotation policy for annotating a corpus including a plurality of electronic documents. The method includes: annotating an occurrence of a first term with a class in an electronic document; recommending a new annotation policy based on at least one annotation for the occurrence of first term; and storing the new annotation policy in a storage device.

5 Claims, 7 Drawing Sheets

(56) References Cited

U.S. PATENT DOCUMENTS

| | | | |
|---|---|---|---|
| 2012/0053946 A1* | 3/2012 | Bellegarda | G10L 13/10 704/260 |
| 2014/0278448 A1* | 9/2014 | Sadeghi | G06Q 50/22 705/2 |
| 2015/0074507 A1* | 3/2015 | Riediger | G06F 16/00 715/230 |
| 2017/0192976 A1 | 7/2017 | Bhatia et al. | |
| 2017/0300533 A1* | 10/2017 | Zhang | G06F 16/9536 |
| 2017/0316347 A1 | 11/2017 | Venanzi et al. | |

* cited by examiner

Annotation Tool — 102

2004-08-087J.docxml — 301

1. V1 was traveling north in the passing lane of a two lane one way, concrete roadway.

2. V2 was exiting the left side parking lane to merge into the passing lane.

3. V1 departed its lane of travel and struck a small tree and a light post along the left roadway with its front before striking the back of V2 with its front.

4. V2 was pushed north where it came to rest on the roadway.

5. V1 came to rest facing north also in the roadway.

6. Both vehicles were towed from the scene and V1 occupant 1 as well as V2 occupant two were transported to medical facilities.

Annotation Assist Unit — 302

I have found suggestions for you!

1. "roadway" looks like it has the type "STRUCTURE."

Double-click my annotations to apply them to this document.

Click here to add "roadway" to your STRUCTURE dictionary. — 303

2. "north" is a cardinal direction that appears frequently in your documents.

Click here to add "north" to a new dictionary called CARDINAL_DIRECTION — 304

FIG. 3

ANNOTATION POLICIES FOR ANNOTATION CONSISTENCY

TECHNICAL FIELD

The present application relates generally to a system, a method and a computer program product that can be used to provide annotation policies, which facilitate consistent annotations of a corpus.

BACKGROUND

Watson Knowledge Studio provides easy-to-use tools for annotating unstructured domain literatures, and uses those annotations to create a custom machine-learning model that understands the language of the domain. When human annotators label corpus data to create ground truth to train a machine learning model, i.e., a classifier, it is necessary to consistently align their annotations with established annotation polices.

Annotation polices are difficult to enforce across multiple users, i.e., annotators. Conflicting annotations from different annotators must be adjudicated because inaccurate or inconsistent annotations will negatively impact the performance of the machine learning model. This process requires time-consuming discussion among human annotators until all conflicts are resolved and/or annotation policies are modified in terms of the discussion.

SUMMARY

Embodiments can provide a computer implemented method in a data processing system comprising a processor and a memory comprising instructions, which are executed by the processor to cause the processor to implement the method for providing an annotation policy for annotating a corpus including a plurality of electronic documents. The computer implemented method comprises annotating an occurrence of a first term with a class in an electronic document; recommending a new annotation policy based on at least one annotation for the occurrence of first term; and storing the new annotation policy in a storage device.

Embodiments can further provide a method, further comprising: annotating at least two occurrences of the first term with the class. The new annotation policy comprises annotating all the occurrences of the first term with the class in the plurality of electronic documents.

Embodiments can further provide a method, further comprising: further comprising: identifying the first term as a synonym of a second term in a dictionary stored in the storage device, wherein the dictionary corresponds to the class of the first term; and wherein the new annotation policy comprises adding the first term into the dictionary.

Embodiments can further provide a method, wherein the new annotation policy comprises: generating a dictionary associated with the class of the first term, wherein the dictionary is stored in the storage device; and adding the first term into the dictionary.

Embodiments can further provide a method, further comprising: retroactively updating the at least one annotation to conform to the new annotation policy.

Embodiments can further provide a method, wherein the new annotation policy comprises a policy name, a policy type, and a triggering condition, wherein the policy type further comprises a REGEX-based type, a taxonomy-based type, a dictionary-based type, and a formatting type, wherein the triggering condition is used for triggering the new annotation policy.

Embodiments can further provide a method, wherein the new annotation policy further comprises a predefined threshold, and the triggering condition and the predefined threshold are used for triggering the new annotation policy. The method further comprises: providing a confidence score for the first term; if the confidence score is higher than or equal to the predefined threshold, and the triggering condition is met, triggering the new annotation policy.

Embodiments can provide a system for enforcing an annotation policy, comprising: a storage device, used for storing at least one annotation policy and at least one dictionary; and an annotation policy engine for annotating an electronic document. The annotation policy engine is configured to: annotate an occurrence of a particular term on the electronic document with a class, identify at least one synonym of the particular term, wherein the at least one synonym is included in a dictionary associated with the class, and recommend annotating the at least one synonym with the class.

Embodiments can further provide a system, wherein the annotation policy engine is further configured to: if at least one recommended annotation of the at least one synonym is approved, store the at least one suggested annotation in the electronic document; if the at least one recommended annotation of the at least one synonym is rejected, ignore the at least one suggested annotation.

Embodiments can further provide a system, wherein the annotation policy engine comprises: a document analyzer, configured to analyze the electronic document, divide the electronic document into a plurality of semantic units and generate a document object model for the electronic document; a policy recommendation unit, configured to provide a suggestion to at least one annotator with respect to applicability of the at least one annotation policy stored in the storage device; a policy learning unit, configured to propose a new annotation policy based on a trend of annotations made by the at least one annotator; a policy enforcement unit, configured to scan the document object model and enforce the at least one annotation policy; and a policy generating and updating unit, configured to add the new annotation policy to the storage device, and update the at least one annotation policy stored on the storage device if the at least one annotation policy is changed.

Embodiments can further provide a system, wherein the annotation policy engine further comprises a policy administration unit, configured to assign the at least one annotation policy to the electronic document.

Embodiments can further provide a system, wherein the document analyzer is further configured to analyze at least one existing annotation, and match the at least one existing annotation to the class and the at least one synonym in the dictionary.

Embodiments can further provide a system, wherein the at least one annotation policy comprises a policy name, a policy type, and a triggering condition. The policy type further comprises a REGEX-based type, a taxonomy-based type, a dictionary-based type, and a formatting type, wherein the triggering condition is used for triggering the new annotation policy.

Embodiments can further provide a system, wherein the at least one annotation policy further comprises a predefined threshold, and the triggering condition and the predefined threshold are used for triggering the annotation policy. The annotation policy engine is further configured to: provide a confidence score for the particular term; if the confidence score is higher than or equal to the predefined threshold, trigger the annotation policy.

Embodiments can further provide a system, wherein the formatting type comprises removing at least one HTML tag, removing at least one breaking space, encoding in UTF-8, and correcting at least one spelling error.

Embodiments can further provide a computer program product for enforcing an annotation policy, the computer program product comprising a computer readable storage medium having program instructions embodied therewith. The program instructions executable by a processor to cause the processor to: provide the annotation policy for annotating an electronic document through an annotation tool; identify at least one annotation error made by an annotator, wherein the at least one annotation error deviates from the annotation policy; and alert the annotator to the at least one annotation error.

Embodiments can further provide a computer program product, wherein the processor is caused to: alert the annotator by providing a warning message on the annotation tool.

Embodiments can further provide a computer program product, wherein the annotation error comprises at least one of annotating an occurrence of a particular term with an inaccurate class, and missing at least one occurrence of the particular term.

Embodiments can further provide a computer program product, wherein the annotation policy comprises a policy name, a policy type, and a triggering condition, wherein the policy type further comprises a REGEX-based type, a taxonomy-based type, a dictionary-based type, and a formatting type, wherein the triggering condition is used for triggering the new annotation policy.

Embodiments can further provide a computer program product, wherein the formatting type comprises removing at least one HTML tag, removing at least one breaking space, encoding in UTF-8, and correcting at least one spelling error.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 depicts an example user interface of an annotation tool, according to some embodiments described herein;

DETAILED DESCRIPTION OF EXEMPLARY EMBODIMENTS

Figure 1:
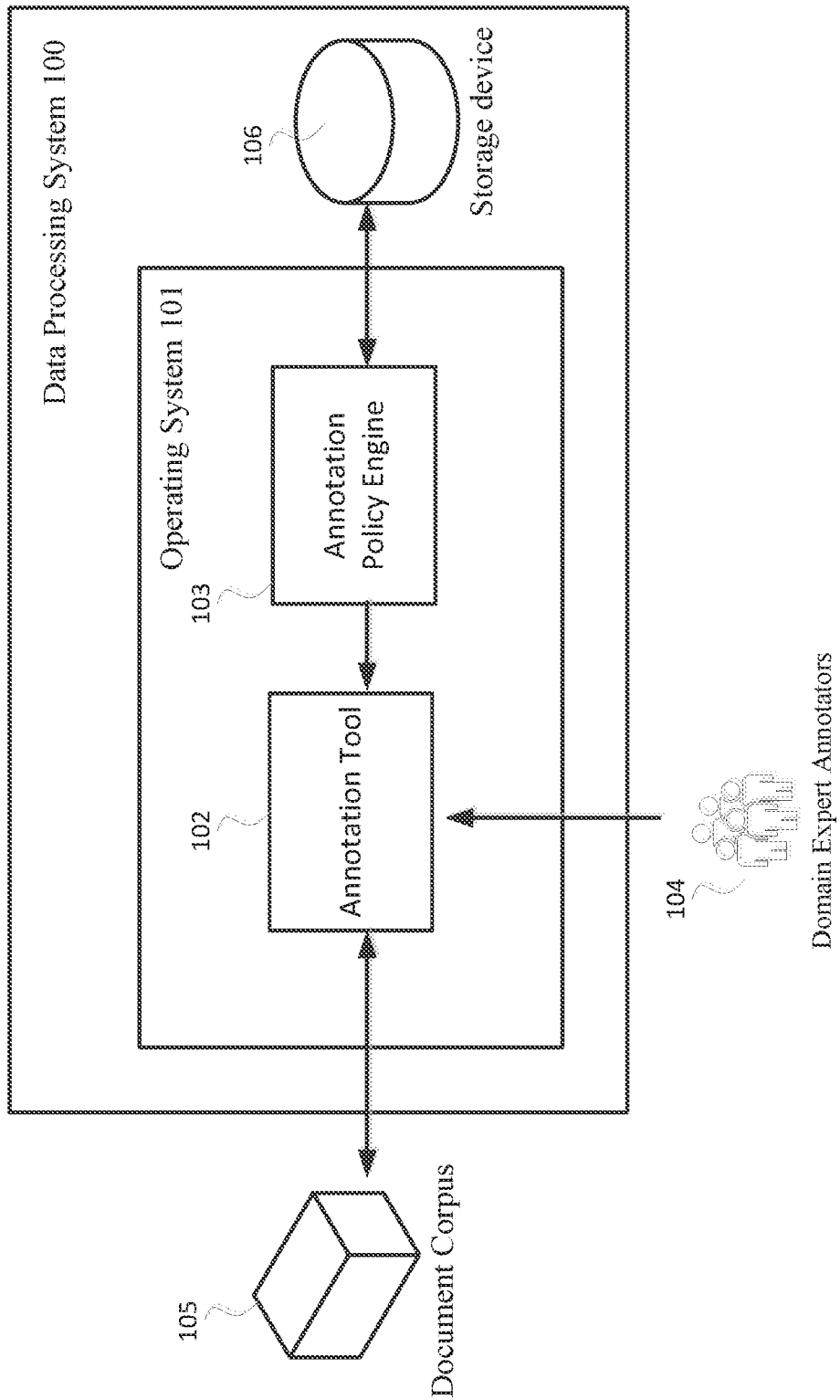
FIG. 1 is a block diagram of an example data processing system in which aspects of the illustrative embodiments are implemented.

Embodiments of the present invention provide a system, method and computer product for providing annotation policies, so that annotators can follow the annotation policies strictly and make consistent annotations, thereby reducing conflicts among the annotators.

In some embodiments, the annotation policies can be automatically recommended based on annotation trends identified in already-annotated data. Specifically, annotation trends are identified when a consistent annotation style repeatedly appears among annotators. In other words, if at least two annotators annotate a particular word/phrase with a certain entity type, relation type, etc., that suggests a trend in an annotation style, or an annotator consistently annotates a particular term (i.e., word or phrase) with a certain entity type, then the annotation policy engine may add the annotation style of that particular word/phrase into an annotation policy. For example, if several domain expert annotators annotate the word "front" with the entity type "PART_OF_CAR," then an annotation policy that the word "front" should be annotated with the entity type "PART_OF_CAR" is recommended by the annotation policy engine. If the chief annotator approves this annotation policy, then this annotation policy will be saved into an annotation policy database and become an official annotation policy. Subsequently, if any annotator does not follow this annotation policy (e.g., an annotator annotates the word "front" with the entity type "DIRECTION") then the annotation policy engine would alert the annotator to the error. To alert the annotator, the annotation policy engine can, for example, send a prompt or other visual or audible indicator that the word "front" should be annotated with the entity type "PART_OF_CAR" to a user interface of an annotation tool.

In some embodiments, the annotation policies can be recommended or altered during the annotation process, and annotations related to the newly established annotation policies would be retroactively amended across all records already annotated. For example, if a new annotation policy is established that the word "front" should be annotated with the entity type "PART_OF_CAR", then all the previous annotations regarding the word "front" would be checked, and if applicable, retroactively amended to follow the newly established policy. In this case, no matter the previous annotations or the subsequent annotations, all the annotations are consistent and conform to the newly established policy.

In some embodiments, the annotation policy engine recommends annotations in accordance with annotation policies to the annotators. For example, if an annotation policy identifies the word "United States" to be annotated with an entity type "COUNTRY," then all the occurrences of "United States" and its synonyms (stored in the COUNTRY dictionary) would be highlighted in a current electronic document and labeled with the entity type "COUNTRY" by the annotation policy engine. The annotator may accept or reject the proposed annotations automatically made by the annotation policy engine. In the field of natural language processing, dictionaries are a list of key-value pairs, where a key can be any term and a value can be a list of synonyms of the term. For example, the term "United States" may have synonyms including "USA," "U.S.," "America," "US," "Murica." All these synonyms are stored in the COUNTRY dictionary. In an embodiment, dictionaries correspond to entity types. For example, the entity type "STRUCTURE" has a STRUCTURE dictionary, and any words or phrases which are annotated with the entity type "STRUCTURE" may be added into the STRUCTURE dictionary. Similarly, the entity type "MANUFACTURER" has a MANUFACTURER dictionary, and any words or phrases which are annotated with the entity type "MANUFACTURER" may be added into the MANUFACTURER dictionary. All the dictionaries are stored in a dictionary database.

In some embodiments, the annotation policy engine can recommend updating a dictionary. For example, the annotation policy engine identifies that the word "roadway" may be annotated with the entity type "STRUCTURE," according to an annotation policy that the word "road way" should be annotated with the entity type "STRUCTURE" (because "roadway" is similar to "road way"). In this case, the annotation policy engine prompts the annotator with "roadway looks like it has the entity type STRUCTURE." Additionally, the annotation policy engine may also propose adding the word "roadway" to the corresponding STRUCTURE dictionary. The annotator or chief annotator may decide whether the word "roadway" can be added into the STRUCTURE dictionary. After the word "roadway" is added into the STRUCTURE dictionary, the word "roadway" would be highlighted and labeled with the entity type "STRUCTURE" automatically in the subsequent annotation process.

In some embodiments, the annotation policy engine can recommend creating a new dictionary. For example, the word "north" appears frequently in an electronic document. The annotation policy engine identifies that the frequent word "north" is a cardinal direction, and thus proposes creating a new CARDINAL_DIRECTION dictionary and adding the word "north" into the new CARDINAL_DIRECTION dictionary. In some embodiments, an option is provided to the annotator to decide whether the proposed new CARDINAL_DIRECTION dictionary should be created. When the CARDINAL_DIRECTION dictionary is created (along with an entity type "CARDINAL_DIRECTION") and the word "north" is added into the CARDINAL_DIRECTION dictionary, the word "north" is highlighted and labeled with the entity type "CARDINAL_DIRECTION" automatically in the subsequent annotation process. Other forms of selecting text besides highlighting and labeling are also contemplated.

FIG. 1 is a block diagram of an example data processing system in which aspects of the illustrative embodiments are implemented. Data processing system 100 is an example of a computer, such as a server or client, in which computer usable code or instructions implementing the process for illustrative embodiments of the present invention are located. In one embodiment, the data processing system 100 represents a computing device, which implements operating system 101. In some embodiments, the operating system 101 can be Windows, Unix system or Unix-like operating systems, such as AIX, A/UX, HP-UX, IRIX, Linux, Minix, Ultrix, Xenix, Xinu, XNU, and the like.

In the depicted example, annotation tool 102 and annotation policy engine 103 run on the operating system 101. In some embodiments, the annotation tool 102 comprises any existing annotation tool for electronic documents, for example, Diigo, A.nnotate, Bounce, Crocodoc, Markup, Scribble, Marqueed, Pundit Annotator, Hypothesis, Notable, Annotatelt, Genius Web annotator, IBM Ground Truth Editor, and the like. Domain expert annotators 104 annotate electronic documents in document corpus 105 through the annotation tool 102. The annotation policy engine 103 enforces annotation policies stored in storage device 106. The storage device 106 can be a hard disk drive, a floppy disk drive, a flash memory, a non-volatile memory, and the like. In other embodiments, the storage device 106 can be located in a different computer, which is connected to the data processing system 100 via a network. In another embodiment, the storage device 106 may be implemented by cloud storage. In an embodiment, the document corpus 105, annotation policies, and dictionaries can all be stored in the same storage device 106. In another embodiment, the document corpus 105, annotation policies, dictionaries can be stored separately in different storage devices.

Figure 2:
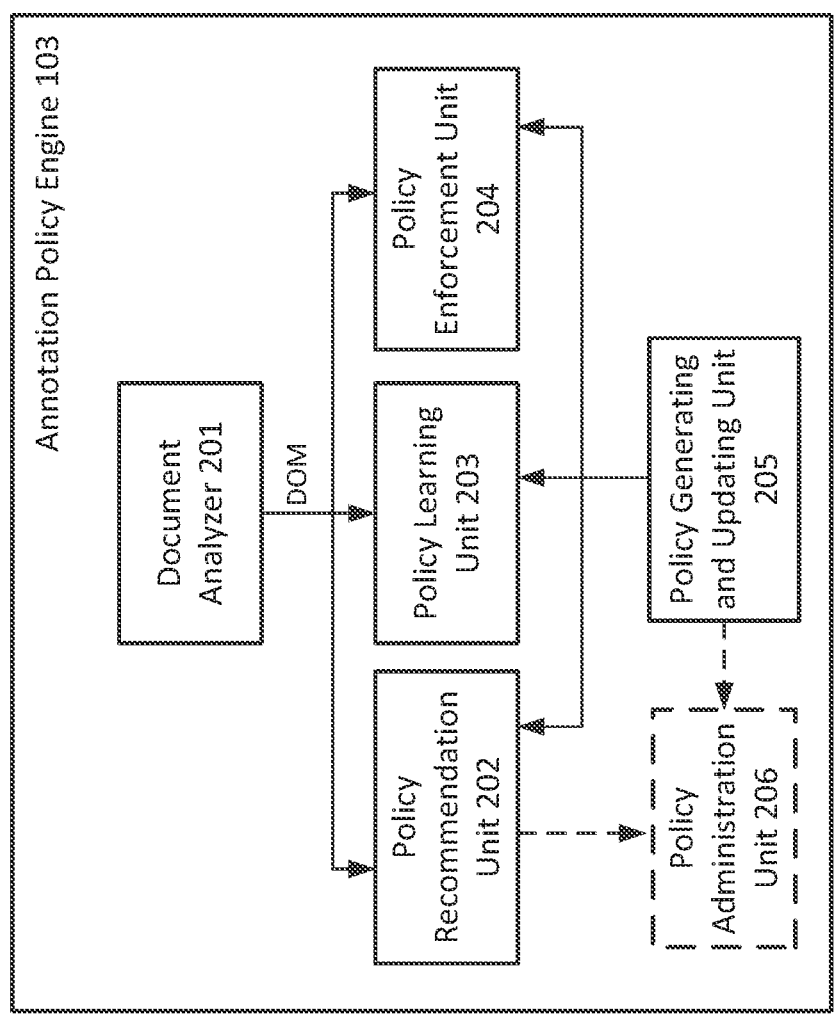
FIG. 2 depicts a block diagram of an example annotation policy engine, according to some embodiments described herein.

FIG. 2 depicts a block diagram of an example annotation policy engine, according to some embodiments described herein. Referring to FIG. 1 and FIG. 2, the annotation policy engine 103 includes document analyzer 201, policy recommendation unit 202, policy learning unit 203, policy enforcement unit 204, and policy generating and updating unit 205. In another embodiment, the annotation policy engine 103 further includes policy administration unit 206.

The document analyzer 201 analyzes electronic documents in the document corpus 105 and divides the electronic documents into semantic units such as sentences, words, phrases, and the like. The document analyzer 201 also identifies entity types and relation types of semantic units. In an embodiment, the document analyzer 201 uses REGEX (regular expression for entity extraction), LUCENE (for full text indexing and searching), AlchemyLanguage, and the like, to identify entity types and relation types. The AlchemyLanguage is a collection of text analysis functions that derive semantic information from the electronic documents. The AlchemyLanguage can categorize contents of the electronic documents into a hierarchical taxonomy. Further, AlchemyLanguage can normalize HTML contents, and remove advertisements, navigation links, and other unimportant contents, so that only important webpage texts are returned.

In an embodiment, the electronic documents may include HTML, XHTML, or XML documents, then the document analyzer 201 analyzes HTML, XHTML, or XML documents and creates document object models. The document object model (DOM) is a cross-platform and language-independent application programming interface that treats an HTML, XHTML, or XML document as a tree structure wherein each node is an object representing a part of the document. In an embodiment, the electronic document may already include one or more annotations. The document analyzer 201 also analyzes existing annotations and matches the existing annotations to entity types (i.e., classes) and dictionary terms of existing polices stored in the storage device 106. DOM is a data representation of an electronic document and existing annotations, and serves as "data" for the new annotations and polices which the new annotations will follow.

Each annotation tool 102 has its own DOM format. For example, the DOM format of IBM Watson Knowledge Studio is JSON file format. The DOM created by the document analyzer 201 is input to the policy recommendation unit 202, the policy learning unit 203, and the policy enforcement unit 204.

The policy recommendation unit 202 can determine which existing annotation policy stored in the storage device 106 will be applied to the document corpus 105 and how an existing annotation policy is triggered. The applicability of each annotation policy depends on the element "triggering condition" of each annotation policy. If the triggering condition is met in the document corpus 105, then the policy recommendation unit 202 will recommend the corresponding annotation policy to the user/annotator. If the user/annotator agrees with the recommendation, then the corresponding annotation policy will be applied to the document corpus 105.

Table 1 depicts four examples of annotation polices, explaining elements of each annotation policy. Table 1 is intended to be non-limiting and is not exhaustive of all the annotation policies.

TABLE 1

Examples of annotation policies

| Policy name (P Name) | Policy Type | Triggering Condition | Threshold | Description |
|---|---|---|---|---|
| P1 | REGEX | *emon | 0.9 | NA |
| P2 | Taxonomy | /farm/animal | 0.99 | NA |
| P3 | Dictionary | Any term in VEHICLE Dictionary | NA | All the vehicle words (car, truck, van, buggy, motorcycle, etc., as defined in "VEHICLE" dictionary) are suggested to be labeled with the entity type VEHICLE. |
| P4 | HTML Format | More than 10 HTML tags | NA | We see a lot of HTML tags in the documents, do you want to enforce the policy that all HTML should be identified? |

Referring to Table 1, in an embodiment, an annotation policy can include five elements: policy name (P.NAME), policy type, triggering condition, threshold, and description. The element "policy name" refers to a name of an annotation policy, for example, P1, P2, P3, P4, etc. The element "policy type" refers to a type of this annotation policy, for example, REGEX-based policy, Taxonomy-based policy, Dictionary-based policy, formatting policy, etc. The element "triggering condition" refers to one or more conditions which are used to trigger the annotation policy. The element "threshold" refers to a predefined threshold value for enforcing an annotation policy. In natural language processing, each word or phrase is provided with a confidence score ranging from 0 to 1, indicating relevancy of each word or phrase. If the confidence score is over the threshold value, then the corresponding annotation policy is enforced. The element "threshold" may be unnecessary for some policies. For example, as to the dictionary-based policy and the formatting policy, the element "threshold" is not required and the element "threshold" can be set as zero or ignored. The element "description" refers to remarks from annotators, and is used to describe an annotation policy. This element "description" is optional.

The annotation policy P1 is a REGEX-based policy. The triggering condition of the REGEX-based policy is a string. As to the annotation policy P1, in an electronic document, any word ending with characters "emon" while having a confidence score over 0.9 will trigger the annotation policy P1.

The annotation policy P2 is a taxonomy-based policy. The triggering condition of the taxonomy-based policy is any term (word or phrase) in a taxonomy tree as defined in a lexical database, such as WordNet, MeSH, etc. As to the annotation policy P2, in an electronic document, any word or phrase under the classification "/farm/animal" while having a confidence score over 0.99 will trigger the annotation policy P2. For example, the words "cow," "goat," "horse" in the electronic documents will trigger the annotation policy P2. In another embodiment, the triggering condition of the annotation policy P2 can be provided as the number of terms under the classification "/farm/animal" being more than a predefined number, for example, 200. If the document corpus 105 has more than 200 terms, such as "cow," "goat," "horse", etc., under the classification "/farm/animal", then the annotation policy P2 is triggered, and all the corresponding terms are labeled with "TAXONOMY".

The annotation policy P3 is a dictionary-based policy. The triggering condition of the dictionary-based policy is any term (word or phrase) in a dictionary stored in the storage device 106. As to the annotation policy P3, in an electronic document, any term included in the VEHICLE dictionary will trigger the annotation policy P3 and be labeled with the entity type "VEHICLE." A recommendation message lain the vehicle words (car, truck, van, buggy, motorcycle, etc., as defined in "VEHICLE" dictionary) are suggested to be labeled with the entity type VEHICLE" will show on the annotation tool 102 to inform the user.

The annotation policy P4 is a formatting policy, more specifically, a HTML formatting policy. The triggering condition of the HTML formatting policy is any HTML tag present in an electronic document. As to the annotation policy P4, if there are over ten HTML tags in an electronic document, then the annotation policy P4 is triggered and a recommendation message "[w]e see a lot of HTML tags in the documents, do you want to enforce the policy that all HTML should be identified?" will show on the annotation tool 102 to inform the user. In an embodiment, there are other formatting policies stored in the storage device 106 to make annotations technically correct and logically correct. For example, a formatting policy requires that HTML tags and breaking spaces be removed from annotations. Another formatting policy requires that all the annotations be encoded in UTF-8. Upon a technical error, a warning message "Attention: this label name contains unsupported characters, such as '$, %, &, @, #, or a space character'" appears on the annotation tool 102. There is also a formatting policy ensuring that all the annotations be spelled correctly.

The policy learning unit 203 continuously learns behaviors of the domain expert annotators 104, and proposes a new policy based on the behaviors. The policy learning unit 203 examines annotations made by annotators over time and spots a trend in annotations which can be captured as a new policy. In an embodiment, the policy learning unit 203 learns that a word or phrase may be annotated with a new entity type or relation type, and then suggests creating a new dictionary and adding this word or phrase into the new dictionary. As an example, the policy learning unit 203 learns that a plurality of annotators annotated the words "truck" and "car" as the "VEHICLE" entity type (i.e., class), and then proposes that a new policy that "truck" and "car" should be annotated as the "VEHICLE" entity type. A message "we see many repeated decisions by annotators to annotate the words 'truck' and 'car' as the VEHICLE class. Do you want to create a NEW policy that enforces that 'truck' and 'car' are always annotated as VEHICLE by all other annotators going forward?" will show on the annotation tool 102. If the chief annotator or annotation team agrees with the proposal, then a new VEHICLE dictionary is created and stored in the storage device 106 and the words "truck" and "car" will be added into the VEHICLE dictionary. In an embodiment, a predefined number of any TERM-LABEL pair is provided to trigger the new policy proposal. As an example, if the truck-VEHICLE pair occurs more than ten times, i.e., the word "truck" is labeled with "VEHICLE" class (i.e., entity type) more than ten times, then the policy learning unit 203 proposes a new policy of adding the word "truck" into a VEHICLE dictionary.

In an embodiment, the policy learning unit 203 learns the trends by machine learning techniques. As an example, the policy learning unit 203 can learn a REGEX (regular expression) pattern that accurately describes any annotation with respect to telephone numbers, ZIP codes, social security numbers, etc., then the policy learning unit 203 proposes a new policy that enforces the learned REGEX pattern on the whole document corpus 105. Any of the existing machine learning algorithms, such as linear regression, logistic regression, classification and regression trees, Naive Bayes, k-nearest neighbours, Apriori, K-means, Bagging with Random Forests, Boosting with AdaBoost, etc., is applicable to the policy learning unit 203.

The policy enforcement unit 204 determines if an annotator's annotations comply with the annotation policies of the document corpus 105. If there is any inconsistency between established annotation policies and annotations made by annotators, the policy enforcement unit 204 will alert the annotator to the errors. The policy enforcement unit 204 scans each document object model created by the document analyzer 201 to ensure that all the annotations have adhered to the annotation policies applied to the document corpus 105. As an example, a policy named "PHONE NUMBER ID" is applied to the document corpus 105, and an annotator has missed a phone number in a document. The policy enforcement unit 204 detects all the strings that match "PHONE NUMBER" class, and identifies that there is one string that matches "PHONE NUMBER" class not labeled, thereby deviating from the policy "PHONE NUMBER ID". Accordingly, a warning message "Attn: Annotations here ['214-333-2018'] do not appear to follow policy PHONE NUMBER ID" appears on the annotation tool 102.

The policy generating and updating unit 205 can add a new annotation policy into the storage device 106 and update an existing annotation policy stored on the storage device 106 if any of the domain expert annotators 104 makes amendments to this existing annotation policy.

The policy administration unit 206 can assign annotation polices to the document corpus 105. In an embodiment, there are a significant number of annotation policies in the storage device 106, and different document corpora may employ different annotation policies in the storage device 106. The policy administration unit 206 can assign applicable annotation polices to the document corpus 105 in a current annotation project. The process of selecting and assigning annotation polices applicable to the current annotation project can be implemented either by a manual lookup or automatic recommendations of the policy recommendation unit 202. In an embodiment, if the storage device 106 only stores annotation policies applicable to the current annotation project, then the policy administration unit 206 may be omitted.

FIG. 3 depicts an example user interface of an annotation tool, according to some embodiments described herein. In this example, referring to FIG. 3, document 2004-08-087J.docxml is being annotated on the annotation tool 102. The content 301 of document 2004-08-087J.docxml is shown on the annotation tool 102. The annotation assist unit 302 is provided as a side-pane on the annotation tool 102. Alternatively, the annotation assist unit can optionally be provided in other visual arrangements, and may include audio. In this example, there are two annotation suggestions 303 and 304 provided by the annotation assist unit 302. As to the annotation suggestion 303, the annotation policy engine 103 (not shown in FIG. 3) identifies that the word "roadway" may be annotated with the entity type "STRUCTURE," because the word "roadway" is similar to the word "road way" stored in the STRUCTURE dictionary. If the annotator or chief annotator agrees with the suggestion (i.e., annotation policy), then the annotator or chief annotator double-clicks an annotation of the word "roadway" shown in the document to apply this annotation policy to the whole document 2004-08-087J.docxml. Specifically, all the occurrences of the word "roadway" are automatically highlighted and labeled with the entity type "STRUCTURE" by the annotation policy engine 103. If the annotator or chief annotator decides to make this annotation policy an official policy, then the annotator or chief annotator clicks, for example, a corresponding link on the annotation assist unit 302, to add the word "roadway" into the STRUCTURE dictionary, and the annotation policy engine 103 updates the STRUCTURE dictionary stored in the storage device 106 (not shown in FIG. 3). Subsequently, during the annotation process for other electronic documents, all the occurrences of the word "roadway" will be automatically highlighted and labeled with the entity type "STRUCTURE" by the annotation policy engine 103. In another embodiment, the annotator or user can use a finger gesture to add the word "roadway" into the STRUCTURE dictionary if the annotation tool 102 is on a touch screen. Alternatively, the annotator or user can use a hand gesture without touching the screen. In yet another embodiment, the annotator or user can add the word "roadway" into the STRUCTURE dictionary by audio control through speech recognition. The annotator or user can use any input means to work on the annotation tool 102, in particular, annotating terms (words or phrases), applying an annotation policy to the whole document, adding a word into a dictionary, etc.

As to the annotation suggestion 304, the annotation policy engine 103 identifies that the word "north" appears frequently, but does not have a predefined entity type. Thus, the annotation policy engine 103 suggests labeling the word "north" with a new entity type "CARDINAL_DIRECTION," creating a new CARDINAL_DIRECTION dictionary in the storage device 106, and adding the word "north" into the new CARDINAL_DIRECTION dictionary. If the suggestion is accepted, then during the annotation process for other electronic documents, all the occurrences of the word "north" will be automatically highlighted and labeled with the entity type "CARDINAL_DIRECTION" by the annotation policy engine 103.

Figure 4:
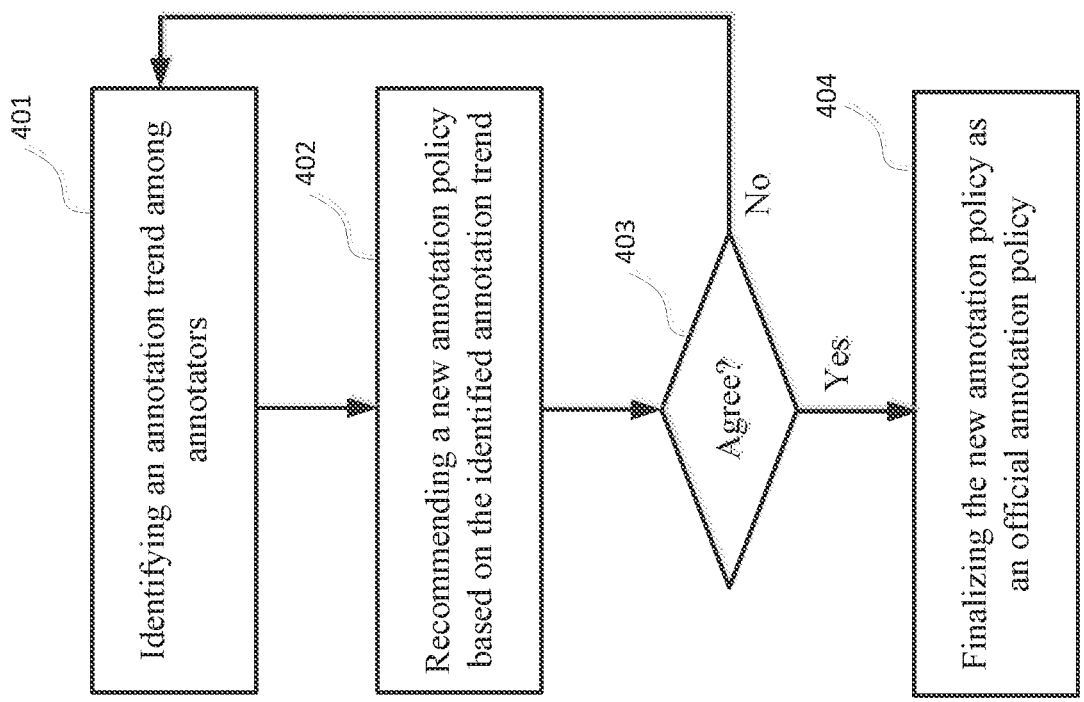
FIG. 4 depicts a flowchart illustrating a method of providing a new annotation policy, according to some embodiments described herein.

FIG. 4 depicts a flowchart illustrating a method of providing a new annotation policy, according to some embodiments described herein. Referring to FIG. 4, in this embodiment, at step 401, the annotation policy engine 103 identifies an annotation trend of a particular annotator or among annotators by machine learning techniques. Specifically, a particular annotator or several annotators can annotate a particular word or phrase with the same entity type or relation type. For example, if an annotator annotates six consecutive numerical numbers as a telephone number several times, or several annotators annotate six consecutive numerical numbers as a telephone number, then the annotation policy engine 103 identifies that the six consecutive numerical numbers are a REGEX pattern of a telephone number, instead of raw numbers per se. The annotation policy engine 103 further identifies this annotation trend of annotating six consecutive numerical numbers as a telephone number, and thus at step 402, recommends a new annotation policy based on the identified annotation trend. For example, the annotation policy engine 103 proposes a new annotation policy that six consecutive numerical numbers should be annotated as a telephone number. At step 403, the annotation policy engine 103 seeks permission from a chief annotator or annotation team. If the chief annotator or annotation team agrees with the new annotation policy, then at step 404, the new annotation policy is finalized as an official annotation policy. Specifically, the new annotation policy is stored in the storage device 106. This annotation policy will be enforced in the subsequent annotations, and/or retroactively enforced in the previous annotations. For example, all the six consecutive numerical numbers will be consistently annotated as a telephone number. However, if the chief annotator or annotation team rejects the new annotation policy, the annotation policy engine 103 would go back to the step 401 to continue to identify a new annotation trend.

Figure 5:
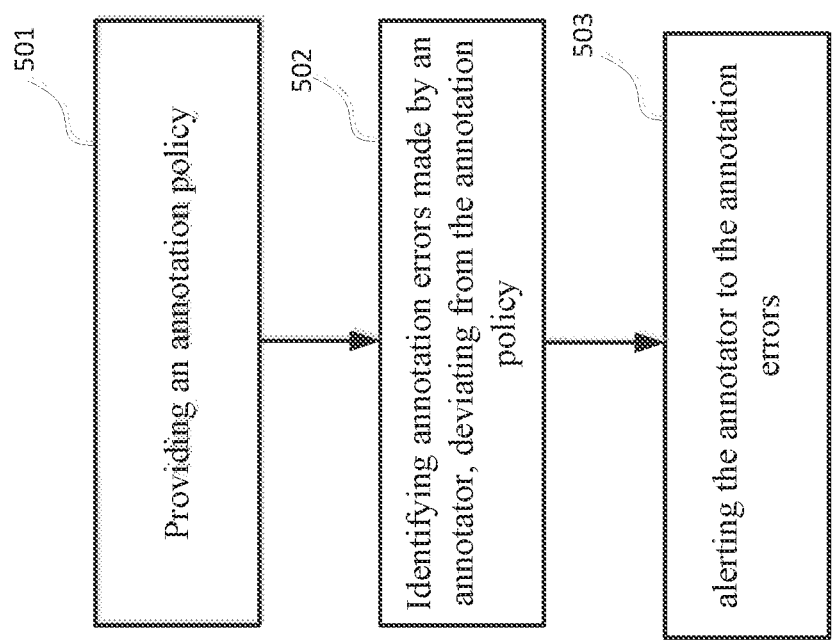
FIG. 5 depicts a flowchart illustrating a method of enforcing an annotation policy, according to some embodiments described herein.

FIG. 5 depicts a flowchart illustrating a method of enforcing an annotation policy, according to some embodiments described herein. Referring to FIG. 5, in this embodiment, at step 501, an annotation policy is provided and stored in the storage device 106. In the storage device 106, there are a plurality of official annotation policies, which are agreed upon and followed by an annotation team. For example, there is an annotation policy that the word "cow" should be annotated with the entity type "ANIMAL," and this annotation policy is stored in the storage device 106. At step 502, the annotation policy engine 103 identifies annotation errors made by an annotator, deviating from this annotation policy. For example, if an annotator incorrectly annotates or misses a couple of occurrences of the word "cow" with the entity type "ANIMAL," then at step 503, the annotation policy engine 103 alerts the annotator to the annotation errors. For example, a warning message "the word 'cow' should be annotated with 'ANIMAL'" appears on the annotation assist unit 302, and all the missed occurrences or inaccurate annotations of the word "cow" are highlighted. The annotator can follow the annotation policy to exhaustively annotate all the occurrences of the word "cow" with the entity type "ANIMAL."

Figure 6:
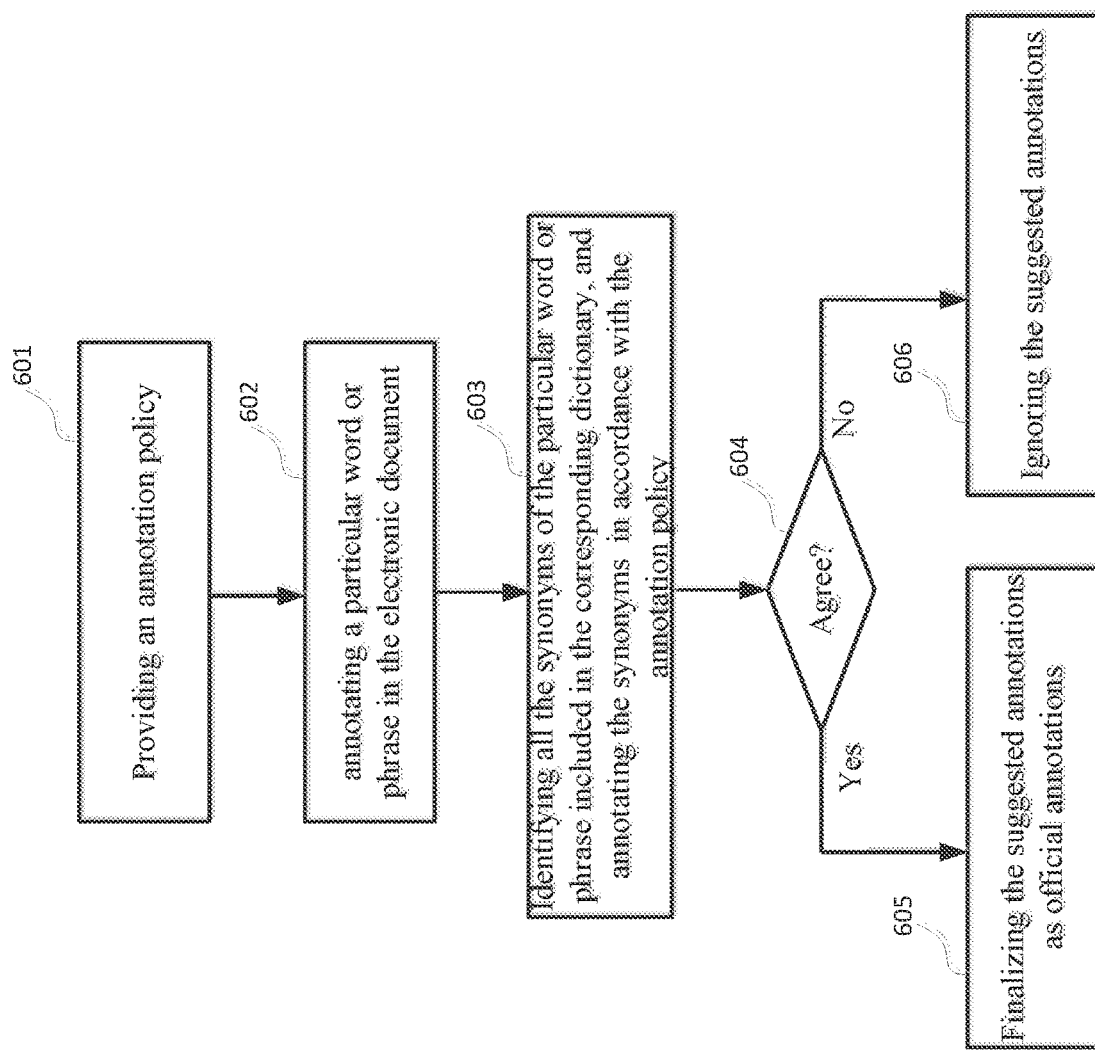
FIG. 6 depicts a flowchart illustrating a method of enforcing an annotation policy, according to other embodiments described herein.

FIG. 6 depicts a flowchart illustrating a method of enforcing an annotation policy, according to other embodiments described herein. Referring to FIG. 6, in this embodiment, at step 601, an annotation policy is provided and stored in the storage device 106. For example, there is an annotation policy that the word "cow" and its synonyms should be annotated with the entity type "ANIMAL." At step 602, the annotator annotates a particular word or phrase in the electronic document. For example, an annotator annotates the word "cow" with the entity type "ANIMAL." At step 603, the annotation policy engine 103 identifies all the synonyms of the particular word or phrase included in the corresponding dictionary and annotates all the synonyms in accordance with the annotation policy. For example, there are thirteen synonyms stored in the ANIMAL dictionary, which is stored in the storage device. The annotation policy engine 103 annotates and highlights all thirteen synonyms in the electronic document. At step 604, the annotation policy engine 103 seeks permission from a chief annotator or annotation team, if the chief annotator or annotation team agrees with the suggested annotations, then at step 605, the suggested annotations are finalized as official annotations. Specifically, the suggested annotations become official annotations and stored in the electronic document. If the chief annotator or annotation team rejects the suggested annotations, then at step 606, the suggested annotations are ignored.

Figure 7:
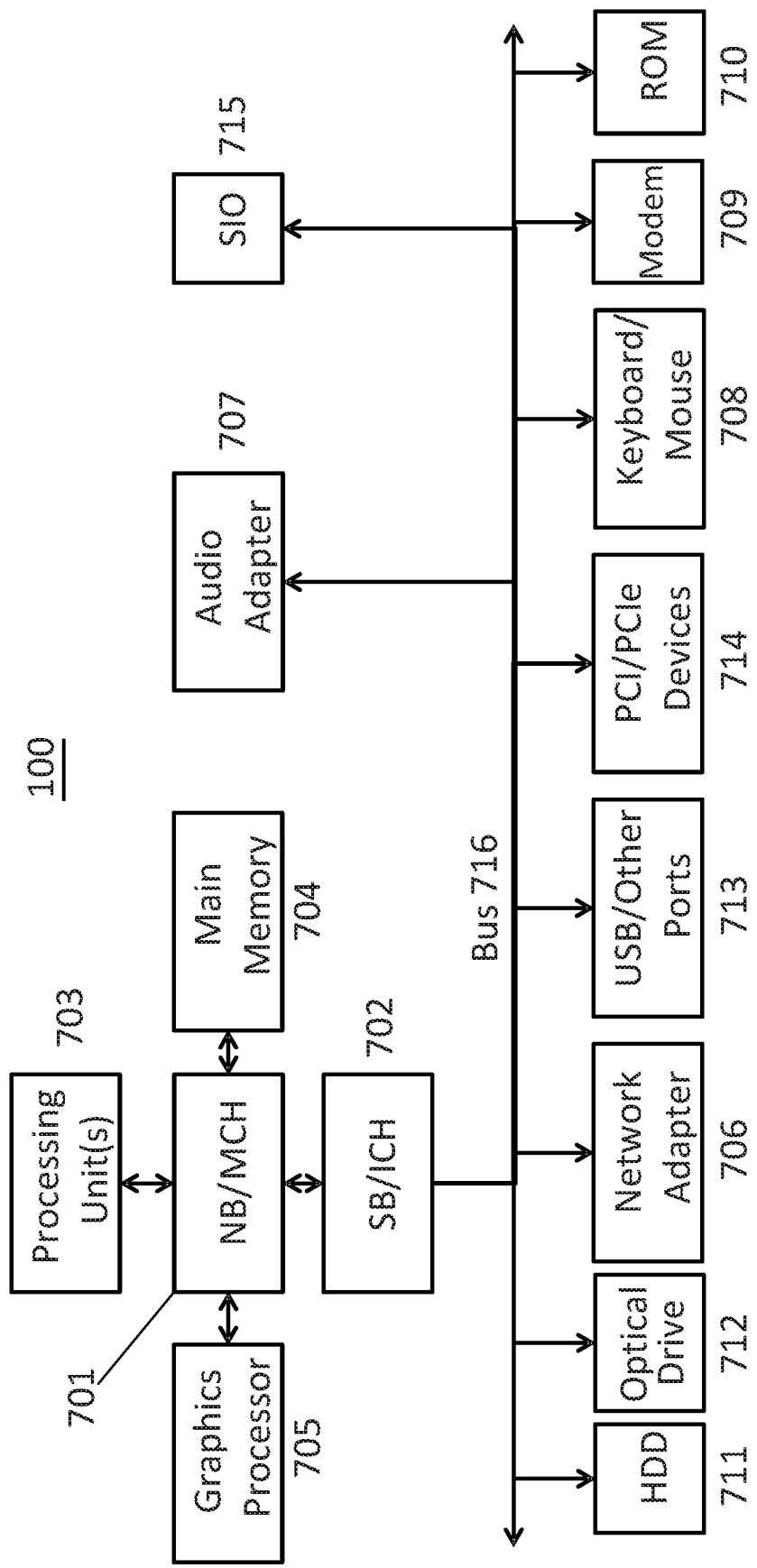
FIG. 7 is a block diagram of another example data processing system in which aspects of the illustrative embodiments may be implemented.

FIG. 7 is a block diagram of an example data processing system 100 in which aspects of the illustrative embodiments may be implemented. In the depicted example, data processing system 100 employs a hub architecture including a north bridge and memory controller hub (NB/MCH) 701 and south bridge and input/output (I/O) controller hub (SB/ICH) 702. Processing unit 703, main memory 704, and graphics processor 705 are connected to the NB/MCH 701. Graphics processor 705 is connected to the NB/MCH 701 through an accelerated graphics port (AGP) (not shown in FIG. 7).

In the depicted example, the network adapter 706 is connected to the SB/ICH 702. The audio adapter 707, keyboard and mouse adapter 708, modem 709, read only memory (ROM) 710, hard disk drive (HDD) 711, optical drive (CD or DVD) 712, universal serial bus (USB) ports and other communication ports 713, and the PCI/PCIe devices 714 are connected to the SB/ICH 702 through bus system 716. PCI/PCIe devices 714 include Ethernet adapters, add-in cards, and PC cards for notebook computers. ROM 710 may be, for example, a flash basic input/output system (BIOS). The HDD 711 and optical drive 712 use an integrated drive electronics (IDE) or serial advanced technology attachment (SATA) interface. The super I/O (SIO) device 715 is connected to the SB/ICH 702.

An operating system 101 may run on processing unit 703. The operating system 101 may coordinate and provide control of various components within the data processing system 100. An object-oriented programming system, such as the Java™ programming system, may run in conjunction with the operating system and provide calls to the operating system from the object-oriented programs or applications executing on the data processing system 100. As a server, the data processing system 100 may be an IBM® eServer™ System P® running the Advanced Interactive Executive operating system or the Linux operating system. The data processing system 100 may be a symmetric multiprocessor (SMP) system that may include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the bookmarking system may be performed by the processing unit 703 using computer usable program code, which may be located in a memory such as, for example, main memory 704, ROM 710, or in one or more peripheral devices.

A bus system 716 may be comprised of one or more busses. The bus system 716 may be implemented using any type of communication fabric or architecture that may provide for a transfer of data between different components or devices attached to the fabric or architecture. A communication unit such as the modem 709 or network adapter 706 may include one or more devices that may be used to transmit and receive data.

Those of ordinary skill in the art will appreciate that the hardware depicted in FIG. 7 may vary depending on the implementation. Other internal hardware or peripheral devices, such as flash memory, equivalent non-volatile memory, or optical disk drives may be used in addition to or in place of the hardware depicted. Moreover, the data processing system 100 may take the form of any of a number of different data processing systems, including but not limited to, client computing devices, server computing devices, tablet computers, laptop computers, telephone or other communication devices, personal digital assistants, and the like. Data processing system 100 may be any known or later developed data processing system without architectural limitation.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112 (f), unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

What is claimed is:

1. A computer implemented method in a data processing system comprising a processor and a memory comprising instructions, which are executed by the processor to cause the processor to implement the method for providing an annotation policy for annotating a corpus including a plurality of electronic documents, comprising:

presenting a user interface of an annotation tool on an electronic document, wherein the electronic document is being annotated on the annotation tool and the user interface includes an annotation assist pane for recommending annotation policies;

annotating an occurrence of a first term with a class in the electronic document by a user;

recommending a new annotation policy in the annotation assist pane based on at least one annotation for the occurrence of first term;

selecting an annotation of the occurrence of first term in the electronic document by the user;

automatically highlighting all the occurrences of the first term in the electronic document and labeling with the class;

applying the new annotation policy to the entire electronic document;

selecting an option presented in the annotation assist pane by the user to add the first term into a storage device;

generating a dictionary associated with the class of the first term in the storage device; and updating the dictionary associated with the class of the first term by adding the first term into the dictionary.

2. The method as recited in claim 1, further comprising: annotating at least two occurrences of the first term with the class, and wherein the new annotation policy comprises annotating all the occurrences of the first term with the class in the electronic document.

3. The method as recited in claim 1, further comprising: identifying synonyms of the first term in the electronic document; and storing the synonyms of the first term into the dictionary associated with the class of the first term.

4. The method as recited in claim 1, wherein the new annotation policy comprises a policy name, a policy type, and a triggering condition, wherein the policy type further comprises a REGEX-based type, a taxonomy-based type, a dictionary-based type, and a formatting type, wherein the triggering condition is used for triggering the new annotation policy, wherein the formatting type comprises removing at least one HTML tag, removing at least one breaking space, encoding in TTTF-8, and correcting at least one spelling error.

5. The method as recited in claim 4, wherein the new annotation policy further comprises a predefined threshold, wherein the triggering condition and the predefined threshold are used for triggering the new annotation policy, the method further comprising:

providing a confidence score for the first term, wherein the confidence score indicates relevancy of the first term to the new annotation policy;

if the confidence score is higher than or equal to the predefined threshold, and the triggering condition is met, triggering the new annotation policy.

* * * * *